United States Patent
Calkin et al.

(10) Patent No.: US 9,964,010 B2
(45) Date of Patent: May 8, 2018

(54) TURBOCHARGER ACTUATION SHAFT EXHAUST LEAKAGE CONTAINMENT METHOD

(71) Applicant: GM Global Technology Operations LLC, Detroit, MI (US)

(72) Inventors: Ryan Calkin, Ferndale, MI (US); Eric Darvin Thomas, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 85 days.

(21) Appl. No.: 15/151,955

(22) Filed: May 11, 2016

(65) Prior Publication Data

US 2017/0328247 A1    Nov. 16, 2017

(51) Int. Cl.
*F01M 11/02* (2006.01)
*F02B 37/24* (2006.01)

(52) U.S. Cl.
CPC ............. *F01M 11/02* (2013.01); *F02B 37/24* (2013.01); *F01M 2011/021* (2013.01)

(58) Field of Classification Search
CPC .... F01M 11/02; F01M 2011/021; F02B 37/24
USPC .............................................. 60/605.1, 605.2
See application file for complete search history.

(56) References Cited

U.S. PATENT DOCUMENTS

| | | | | |
|---|---|---|---|---|
| 5,079,921 | A * | 1/1992 | McCandless | F02B 37/025 123/323 |
| 6,269,642 | B1 * | 8/2001 | Arnold | F01D 17/165 415/163 |
| 6,543,227 | B2 | 4/2003 | He et al. | |
| 6,679,057 | B2 * | 1/2004 | Arnold | F01D 17/12 415/158 |
| 6,729,134 | B2 | 5/2004 | Arnold et al. | |
| 7,024,855 | B2 | 4/2006 | Perrin et al. | |
| 8,047,772 | B2 | 11/2011 | Petitjean et al. | |
| 8,209,979 | B2 | 7/2012 | Wang et al. | |
| 8,302,397 | B2 | 11/2012 | Liu et al. | |
| 8,474,433 | B2 * | 7/2013 | French | F01D 25/16 123/320 |
| 8,695,337 | B2 | 4/2014 | Proctor | |
| 8,727,696 | B2 * | 5/2014 | Cox | F01D 17/10 29/407.05 |
| 9,194,304 | B2 * | 11/2015 | French | F01D 25/16 |
| 2010/0037855 | A1 * | 2/2010 | French | F01D 25/16 123/323 |
| 2011/0094221 | A1 | 4/2011 | Ge et al. | |
| 2015/0361839 | A1 * | 12/2015 | Kimura | F01M 5/002 123/196 A |

* cited by examiner

*Primary Examiner* — Hoang Nguyen
(74) *Attorney, Agent, or Firm* — Harness, Dickey & Pierce, P.L.C.

(57) ABSTRACT

An internal combustion engine, includes a turbocharger with a variable geometry turbine having an actuator shaft passing through the turbocharger housing. The actuator shaft opening is vented to the engine crankcase for diverting exhaust that passes through the actuator shaft opening to the crankcase instead of being released to the under-hood environment.

2 Claims, 3 Drawing Sheets

TURBOCHARGER ACTUATION SHAFT EXHAUST LEAKAGE CONTAINMENT METHOD

FIELD

The present disclosure relates to a turbocharger actuation shaft exhaust leakage containment method.

BACKGROUND AND SUMMARY

This section provides background information related to the present disclosure which is not necessarily prior art.

An internal combustion engine may use a turbocharger to increase density of air and consequently the amount of air that enters the engine. The increased amount of air enables more fuel to be injected into the engine, thereby increasing engine power. A turbocharger generally includes a turbine, an air compressor, and a shaft that connects the turbine to the air compressor. The turbine is driven by exhaust gas that flows from an exhaust manifold. The air compressor is driven by the turbine to compress the air that enters an intake manifold.

High-efficiency turbochargers can employ variable geometry systems to increase performance and efficiency. Conventional variable geometry turbines can include a variable geometry element such as a set of movable vanes or a nozzle ring that are used to control pressure of the exhaust gas flowing through the turbine. The flow of exhaust gas is low at low engine speeds. In the case of a movable vane system, the movable vanes direct the trajectory of the exhaust gas approaching the blades of the rotating turbine wheel, so as to vary the change in momentum of the gas as it passes the turbine wheel. Varying the torque imparted to the wheel, varies the rotating speed of the turbine wheel. An indirect effect of varying the vane angle and change in work is the change in turbine inlet pressure at a given flow rate.

In the case of a movable nozzle ring, the ring is movable concentric with the axis of rotation of the turbine to reduce or increase the area of the nozzle inlet in order to optimize the turbine's efficiency based upon the engine sped.

Variable geometry turbines generally include an actuator for varying the geometry of the turbine system. The actuator system can include an electromechanical actuator or servomotor that is drivingly connected to an actuator shaft or arm that passes through the turbocharger housing for adjusting the variable geometry turbine. Due to the high temperature of the turbine housing, shaft seals are incapable of adequately sealing around the actuator shaft without durability concerns.

Accordingly, an internal combustion engine is provided with a turbocharger with a variable geometry turbine having an actuator shaft or arm passing through the turbocharger housing. The actuator shaft opening is vented to the engine crankcase for diverting exhaust that passes through the actuator shaft opening to the crankcase.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
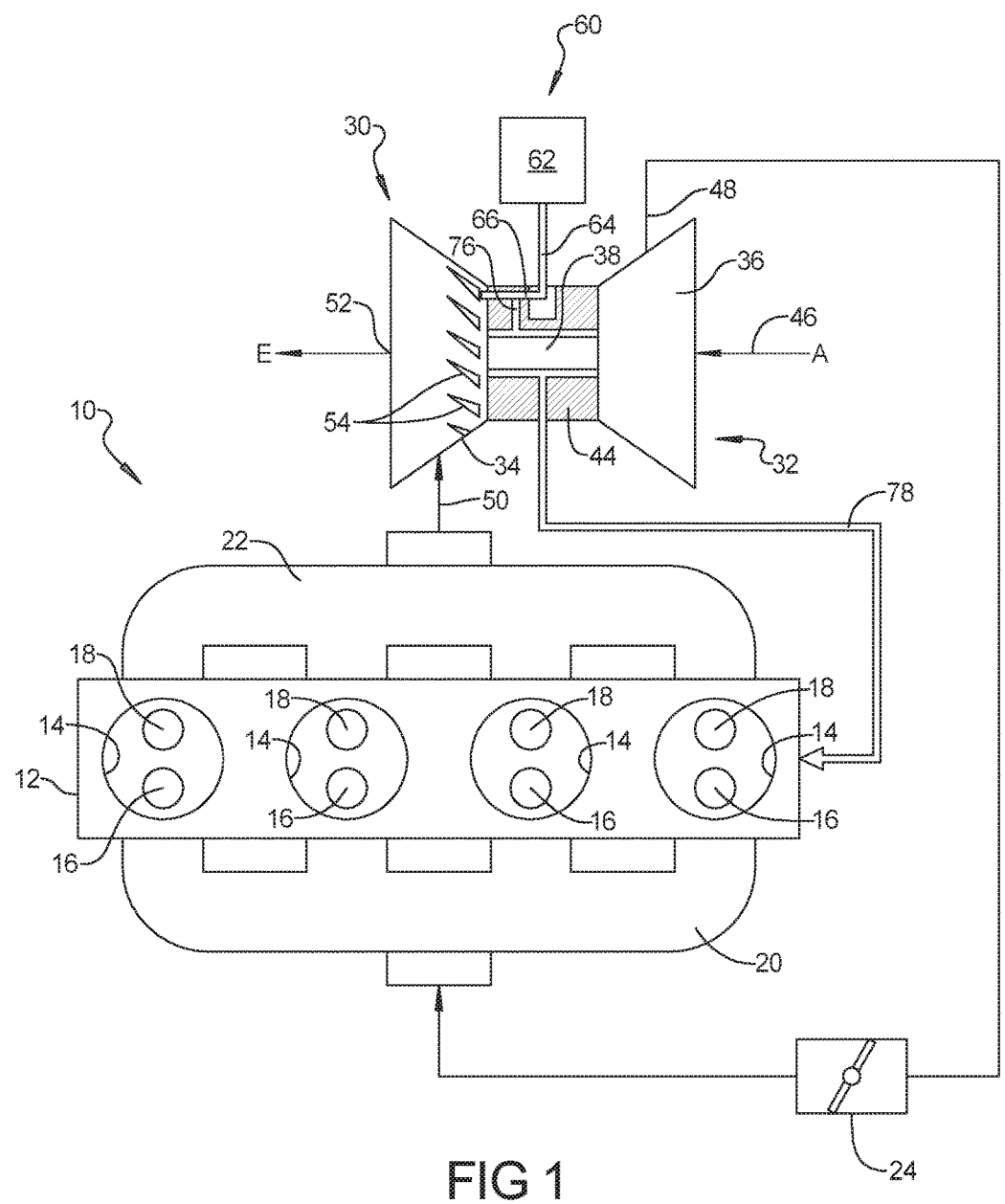
FIG. 1 is a schematic illustration of an engine assembly according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

An engine assembly 10 is illustrated in FIG. 1 and may include an engine structure 12 defining cylinders 14 and intake and exhaust ports 16, 18 in communication with the cylinders 14, an intake manifold 20, exhaust manifold 22, a throttle valve 24 and a turbocharger 26. The engine structure 12 can include a cylinder block that defines the cylinders 14 and a crank case as is known in the art. The engine structure can also include a cylinder head that defines the intake and exhaust ports 16, 18. The engine structure 12 includes a plurality of pistons disposed in the cylinders 14 and connected to a crankshaft disposed in the crankcase. The engine assembly 10 is illustrated as an inline four cylinder arrangement for simplicity. However, it is understood that the present teachings apply to any number of piston-cylinder arrangements and a variety of reciprocating engine configurations including, but not limited to, V-engines, in-line engines, and horizontally opposed engines, as well as both overhead cam and cam-in-block configurations.

The turbocharger 26 includes a housing 28 (FIG. 2) defining a turbine section 30 and a compressor section 32. The turbine section 30 includes a turbine wheel 34 and the compressor section includes a compressor wheel 36. A shaft 38 connects the turbine wheel 34 and the compressor wheel 36. The shaft is supported by a first bearing 40 and a second bearing 42 (FIG. 2) within a shaft support section 44 of the housing 28. The first and second bearing 40, 42 are lubricated by oil supply passages 43. The housing 28 may define an intake air inlet 46 and an intake air outlet 48 in the compressor section 32 and an exhaust gas inlet 50 and an exhaust gas outlet 52 in the turbine section 30.

Figure 2:
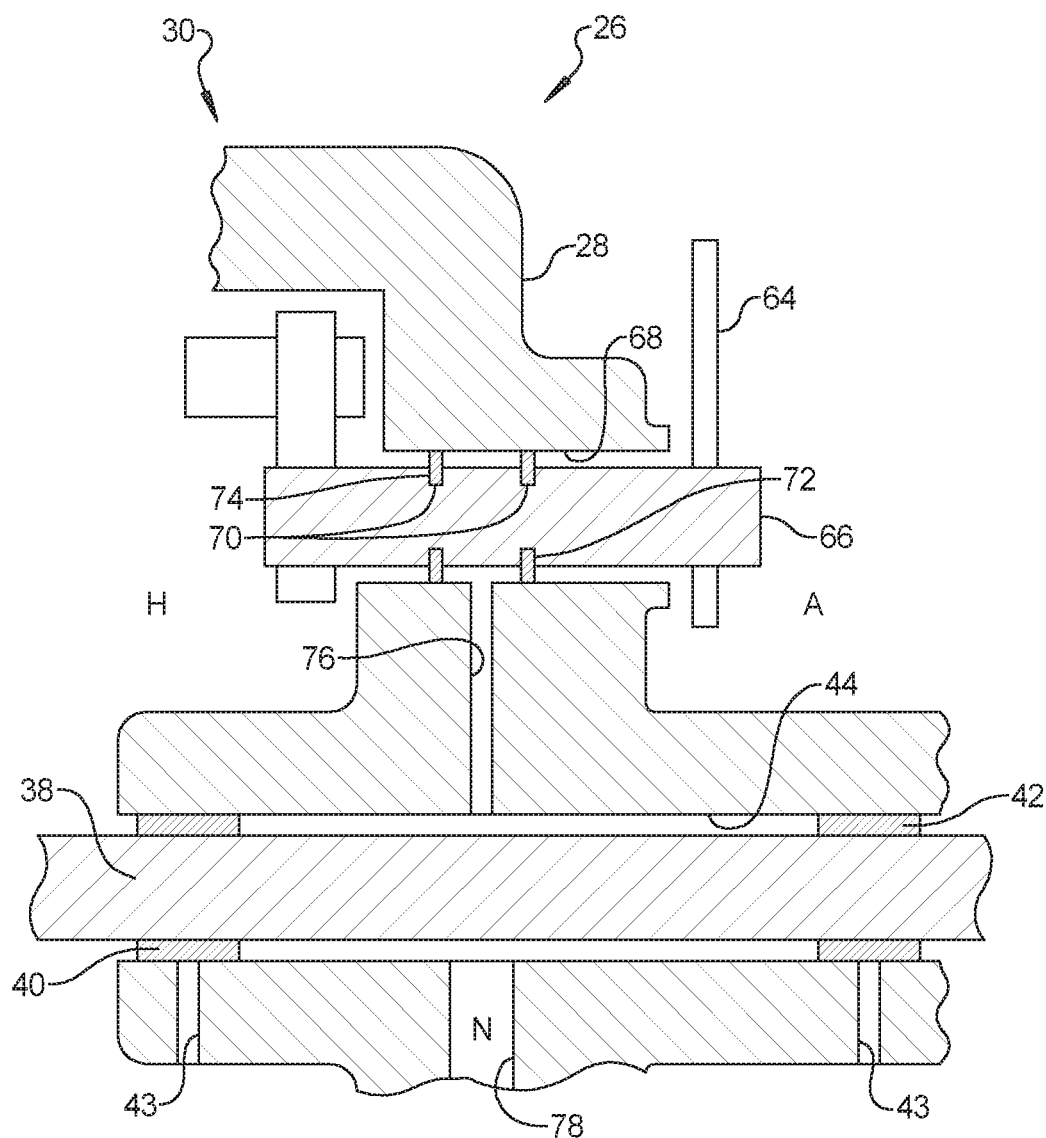
FIG. 2 is a schematic section illustration of the actuator shaft extending through the turbocharger housing.

The turbine section 30 is a variable geometry turbine that can include movable vanes 54 or alternatively a movable nozzle ring or another known configuration of a variable geometry turbine. An actuator system 60 includes an electromechanical, servo, hydraulic, pneumatic or other known actuator 62 that can activate a lever 64 or other drive member that is connected to an actuator shaft 66 for affecting adjustment of the variable geometry turbine 30 in a manner that is known in the art. As shown in FIG. 2, the actuator shaft 66 extends through a shaft opening 68 of the housing 28. The shaft 66 can include a pair of annular grooves 70 recessed therein for receiving respective metal piston-type rings 72, 74 therein. A passage 76 is provided in communication with the shaft opening 68 of the housing at a location between the rings 72, 74. The passage 76 is provided in communication with an oil drain 78 of the turbocharger housing 28 that is in communication with the engine crankcase within the cylinder block.

In operation, exhaust gases that pass through the housing 28 of the turbine section 30 of the turbocharger 26 provide an high pressure region H to the left of the shaft seal 74 and the bearing 40, as shown in FIG. 2. The high pressure exhaust gasses are not fully prevented from leaking past the piston-type ring 74 and can enter an annular space between the rings 72, 74. The passage 76 which is in communication with the engine crankcase is typically at negative pressure N which is below the ambient pressure A on the outboard side of the second ring 72. Therefore, exhaust gases that enter the space between the rings 72, 74 are drawn through the lower pressure passage 76, through the oil drain 78 of the turbocharger and into the crankcase where the exhaust gases can be properly filtered or otherwise processed in the same manner as other crankcase gasses in the crankcase ventilation system. The pressures relevant to the present disclosure include the ambient pressure A to the right of the seal ring 72, the turbine inlet pressure H to the left of the bearing 40 and the seal ring 74, the negative pressure N between the seal rings 74, 72 that is in communication with the 76, the passage 78 and the crankcase. The crankcase pressure is normally maintained at or below ambient by way of vacuum limiting device that can transport crankcase gas back to the turbo compressor inlet.

Figure 3:
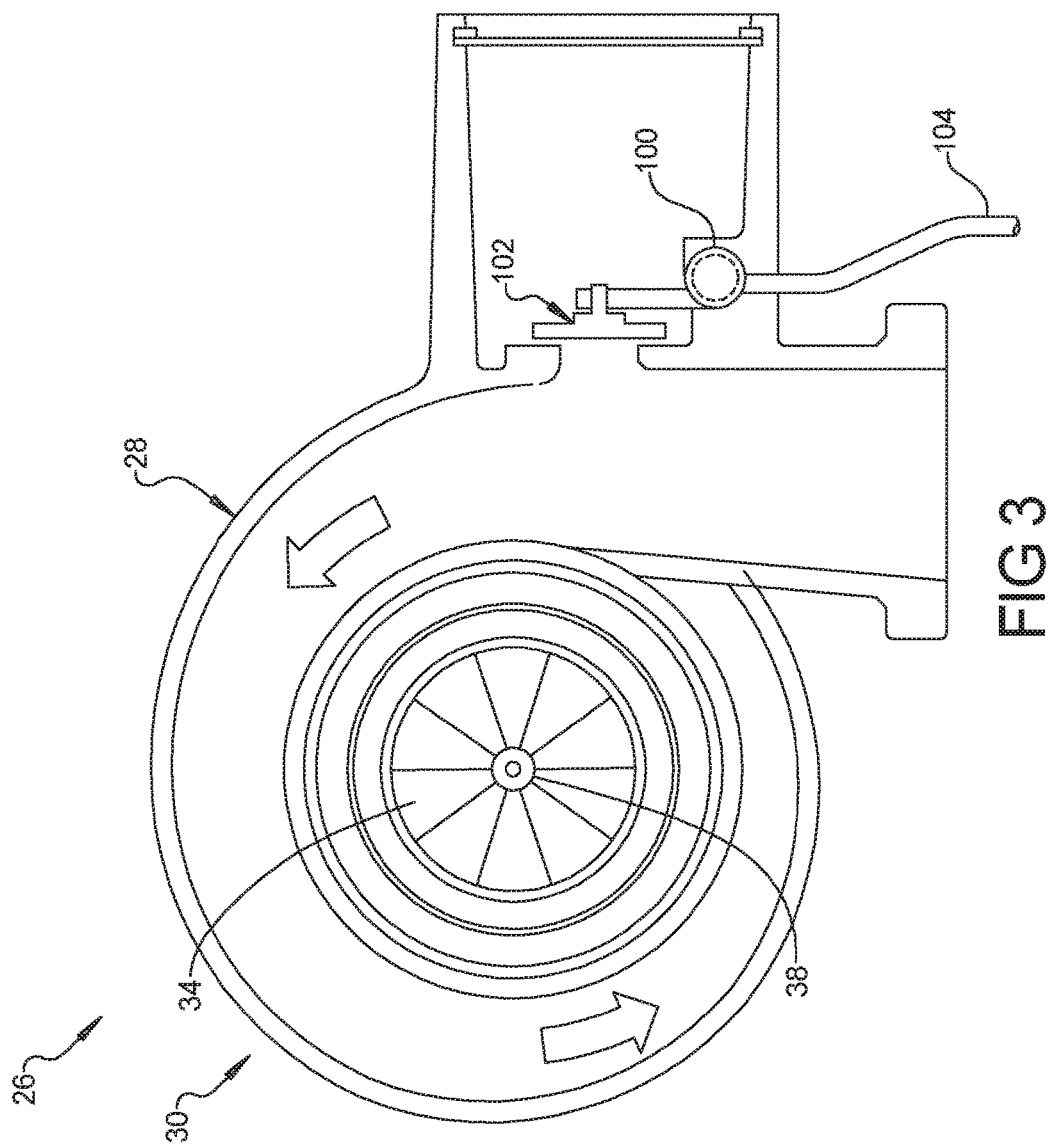
FIG. 3 is a schematic section illustration of a turbocharger having a wastegate having an exhaust containment passage connected to a crankcase according to the principles of the present disclosure.

The present disclosure can be applied to other components that are provided within the engine exhaust system such as, for example, a turbocharger wastegate actuator shaft 100 for a wastegate 102 that bypasses the turbine 30, as shown in FIG. 3, or for example, an EGR bypass valve actuator for an EGR valve disposed in the exhaust passage or other such devices that present exhaust leakage challenges. In particular, the component can be provided with a passage or tube 104 that is in communication with the negative pressure crankcase for drawing leaked exhaust gasses away from the ambient environment to be treated by the crankcase ventilation system. This technique allows the leakage of exhaust gasses around the component to be suitably contained without requiring a zero leak seal.

The present disclosure provides a system for controlled containment of the exhaust gases that leak through the shaft opening 68 around an actuator shaft 66/100 or other component by diverting the leaked exhaust to the engine crank case rather than attempting to completely seal off the leak from the ambient environment which would typically involve durability concerns.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An internal combustion engine, comprising:
    an engine structure including a cylinder block defining a plurality of cylinder bores and a crank case and a cylinder head mounted to the cylinder block, the engine structure defining a plurality of intake runners and a plurality of exhaust runners in communication with the plurality of cylinders;
    an intake system includes an air intake passage in communication with a compressor section of a turbocharger and a compressed air passage in communication with the compressor section of the turbocharger and the plurality of intake runners;

an exhaust system includes an exhaust passage in communication with the plurality of exhaust runners and a turbine section of the turbocharger, the turbocharger including a turbocharger shaft connecting a compressor wheel of the compressor section and a turbine wheel of the turbine section, the turbocharger including a first housing section receiving the turbocharger shaft and an actuator shaft passing through a second housing section of the turbocharger at a spaced location from the turbocharger shaft; and a passage in communication with the second housing section receiving the actuator shaft, the first housing section receiving the turbocharger shaft and the crankcase for diverting exhaust that passes through the housing section around the actuator shaft to the crankcase.

2. The internal combustion engine according to claim 1, wherein the passage is in communication with an oil drain of the turbocharger.

* * * * *